United States Patent
Hatch

(10) Patent No.: US 7,158,894 B2
(45) Date of Patent: Jan. 2, 2007

(54) RESIDENTIAL FUEL TANK MONITORING SYSTEM AND PROACTIVE REPLACEMENT PROGRAM

(75) Inventor: Michael R. Hatch, Gilmanton, NH (US)

(73) Assignee: Boston Environmental, LLC, Portsmouth, NH (US)

( * ) Notice: Subject to any disclaimer, the term of this patent is extended or adjusted under 35 U.S.C. 154(b) by 10 days.

(21) Appl. No.: 11/042,368

(22) Filed: Jan. 25, 2005

(65) Prior Publication Data

US 2006/0167660 A1  Jul. 27, 2006

(51) Int. Cl.
*G06F 3/01* (2006.01)

(52) U.S. Cl. ............ 702/30; 702/31; 702/39; 702/97

(58) Field of Classification Search ........... 702/19, 702/50, 51, 81, 127, 182, 183, 30, 31, 39, 702/97; 73/592, 799; 705/4, 11
See application file for complete search history.

(56) References Cited

U.S. PATENT DOCUMENTS

| | | | |
|---|---|---|---|
| 6,367,328 B1 * | 4/2002 | Gorman et al. ............... 73/592 |
| 6,843,135 B1 * | 1/2005 | Douglas et al. .............. 73/799 |
| 6,851,319 B1 * | 2/2005 | Ziola et al. .................. 73/622 |
| 2004/0243462 A1 * | 12/2004 | Stier ............................ 705/11 |
| 2005/0126265 A1 * | 6/2005 | Herzog et al. ............... 73/49.2 |
| 2005/0284218 A1 * | 12/2005 | Lagergren ................. 73/290 V |

* cited by examiner

*Primary Examiner*—Marc S. Hoff
*Assistant Examiner*—Felix Suarez
(74) *Attorney, Agent, or Firm*—Weingarten, Schurgin, Gagnebin & Lebovici LLP

(57) ABSTRACT

A data collection and management system is provided for monitoring the condition of fuel tanks and for determining for each tank a degradation profile which provides an estimate of useful tank life and a prediction of when the tank is likely to need replacement before failure. The system is especially useful for monitoring residential fuel tanks and is also applicable for commercial and other tanks which are in a location where a tank failure would be harmful and potentially hazardous. A primary benefit of the system is to allow fuel dealers to identify tanks that should be replaced before they actually fail. The system provides the dealer with information which is useful in monitoring and servicing the fuel tanks of the dealers' customers.

13 Claims, 14 Drawing Sheets

*Tank Inspection Form*

Qualifications for New Tanks
 ---Tank must show no signs of leaking or have previously leaked, been patched or repaired or have excessive rust.
 ---Tank must have all ultrasonic readings above .08 for 12 gauge and above .069 for 14 gauge.
 ---New Tank Thicknesses: 12 gauge .096 - .115 14 gauge .084 - .074 10 gauge: .135 - .125

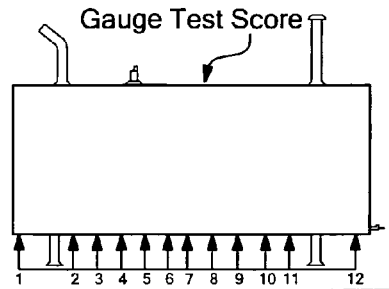

| Account#: | |
|---|---|
| Costomer Demographics | |
| First Name: | City: |
| Last Name: | State/Province: |
| Address Line 1: | Zip/Postal Code: |
| Address Line 2: | Country: |

| Tank Information | | | |
|---|---|---|---|
| Tank Gauge:  10  12  14 | Gauge Test Score: | Distance From Wall: | <2"  >2" |
| Feed Type.  Bottom  Side  Top | | Feed Line in Concrete: | Yes  No |
| Tank Type.  Upright  Flat | | Exposed to Salt Water: | Yes  No |
| Capacity.  gal/hr | | Seasonal Residence: | Yes  No |
| Manufacturer: | | | |

| Outside Location | |
|---|---|
| On a Pad?  Yes  No | Dirt Floor:  Yes  No |
| Hazards?  Yes  No | Finished Basement:  Yes  No |
| If yes, comment below. | Basement Condition:  Wet  Dry |

| Reading Information |
|---|
| Date:  Month  Day  Year |
| Lowest Ultrasonic Reading: |
| Location of Low Test (please check one)  1  2  3  4  5  6  7  8  9  10  11  12 |
| Status (please check one)  Pass  Fail |
| Code Comments: |
| Inspector |

*FIG. 2*

Using The System
Enter Reading Steps

Step 2:
Enter customer and tank data from Tank Inspection Form

Main Functions
- Enter Reading
- Account List
- Data Trend Report
- Renewal Report

Forms
- Inspection Form
- Warranty Certificate

AAA Oil Company
Change Password | Help | Log Out

Customer Demographics
- First Name:
- Last Name:
- Address Line 1:
- Address Line 2:
- City:
- State/Province:
- Zip/Postal Code:
- Country:

Tank Information
- Tank Gauge: ○ 10 ○ 12 ○ 14
- Feed Type: ○ Bottom ○ Side ○ Top
- Tank Type: ○ Upright ○ Flat
- Capacity: ____ gal/hr
- Manufacturer: Alpha

- Distance From Wall: ○ <2" ○ >2"
- Feed Line in Concrete: ○ Yes ○ No
- Exposed to Salt Water: ○ Yes ○ No
- Seasonal Residence: ○ Yes ○ No ○ Outside Location
- Hazards? ○ Yes ○ No
- Outside Pad? ○ Yes ○ No ○ Inside Location
- Dirt Floor: ○ Yes ○ No
- Finished Basement: ○ Yes ○ No
- Basement Condition: ○ Wet ○ Dry

Using The System
Enter Reading Steps

Main Functions
» Enter Reading
» Account List
» Data Trend Report
» Renewal Report

Forms
» Inspection Form
» Warranty Certificate

AAA Oil Company
Change Password | Help | Log Out

Enter Reading - Tank Reading
Step [1] [2] [3] [4]

Account Number: 8989

Reading Information

Date: Aug ▼ 31 ▼ 2004 ▼
Lowest Ultrasonic Reading: ____
Location of Low Test: 1 ▼
Status: ○ Pass ○ Fail
Reason for Failure: Select One ▼
Comments: ____
Inspector: ____

[Continue]

Step 3:
Enter ultrasonic and visual data from Tank Inspection Form

- Low Test Score(s) of .08/.069 or below (12g/14g) click on fail
  [Reminder: This is the qualifying criteria for new TankSure™ Tanks]

- If a tank fails due to a low score or other reason, please select a reason for failure

*FIG. 6*

Using The System
Data Trend Report Example 1

Boston Environmental - Microsoft Internet Explorer

File Edit View Favorites Tools Help

Back • Search Favorites Media

Address http://209.235.206.106/index.asp

Change Password | Help | Log Out

AAA Oil Company

Main Functions
» Enter Reading
» Account List
» Data Trend Report
» Renewal Report

Forms
» Inspection Form
» Warranty Certificate

Data Trend Report

*Summary*

Selected: Tank Status Pass

Total Records: 502    Total Replace: 2    Replace Percentage: 0.398 %

Change Selection

*Detail*

Records: 1 through 25 of 502

1 2 3 4 5 6 7 8 9 10 11 12 13 14 15 16 17 18 19 20 21 Next >>

| Account | Name | YOP | ILTS | CLTS | DPI | IRS | Replace |
|---------|------|-----|------|------|-----|-----|---------|
| 1510 C  | Devie | 2 | 0.083 | 0.077 | 0.006 | 0.082 | -0.005 ⚑ |
| 1503    | Lobello | 2 | 0.081 | 0.075 | 0.006 | 0.078 | -0.003 ⚑ |
| 101 C   | Jones | 3 | 0.09 | 0.08 | 0.010 | 0.079 | 0.001 |
| 1450    | Kincses | 3 | 0.086 | 0.081 | 0.005 | 0.079 | 0.002 |
| 1321    | Bull | 1 | 0.085 | 0.081 | 0.004 | 0.076 | 0.005 |
| 1339    | Filipchuk | 1 | 0.095 | 0.086 | 0.009 | 0.081 | 0.005 |
| 1309 C  | Pritchard | 3 | 0.088 | 0.083 | 0.005 | 0.077 | 0.006 |
| 1028    | Aldridge | 3 | 0.089 | 0.083 | 0.006 | 0.076 | 0.007 |
| 1456    | Dykes | 3 | 0.083 | 0.08 | 0.003 | 0.073 | 0.007 |

All Data Selected - Go

- Sortable by Column Headings
- Algorithms drive the proactive process of replacing tanks
- Negative replace values (flagged accounts) are candidates for Proactive replacement. Please call BE Account Rep before changing tanks

*FIG. 9*

Using The System
Data Trend Report Example 2

Boston Environmental - Microsoft Internet Explorer

File Edit View Favorites Tools Help

Back | Search Favorites Media

Address http://209.235.206.106/index.asp

Change Password | Help | Log Out

AAA Oil Company

Main Functions
» Enter Reading
» Account List
» Data Trend Report
» Renewal Report

Forms
» Inspection Form
» Warranty Certificate

Data Trend Report

*Summary*

Selected: Tank Status Pass, Seasonal
Total Records: 21    Total Replace: 1    Replace Percentage: 4.762 %    Change Selection

*Detail*

Records: 1 through 21 of 21

1

| Account | Name | YOP | ILTS | CLTS | DPI | IRS | Replace |
|---|---|---|---|---|---|---|---|
| 1510 C | Devie | 2 | 0.083 | 0.077 | 0.006 | 0.082 | -0.005 |
| 101 C | Jones | 3 | 0.09 | 0.08 | 0.010 | 0.079 | 0.001 |
| 4001 | Symith | 1 | 0.091 | 0.085 | 0.006 | 0.078 | 0.007 |
| 1198 | Bellas | 2 | 0.084 | 0.084 | 0.000 | 0.072 | 0.012 |
| 1196 | Nicholls | 2 | 0.088 | 0.088 | 0.000 | 0.072 | 0.016 |
| 103 C | Jones, Jr. | 3 | 0.09 | 0.088 | 0.002 | 0.071 | 0.017 |
| 12556 | mills | 1 | 0.093 | 0.093 | 0.000 | 0.076 | 0.017 |
| 6634 | Oil | 1 | 0.091 | 0.091 | 0.000 | 0.072 | 0.019 |
| 1197 | Tataryn | 1 | 0.091 | 0.091 | 0.000 | 0.072 | 0.019 |
| 1039 | Hertlein | 1 | 0.091 | 0.091 | 0.000 | 0.072 | 0.019 |

Seasonal Residences Only - Go

- Show those accounts with a seasonal residence

*FIG. 10*

Using The System
Data Trend Report Example 3

Data Trend Report

*Summary*

Selected: Tank Status Fail

Total Records: 146    Total Replace: 104    Replace Percentage: 71.233 %    Change Selection

*Detail*

Records: 1 through 25 of 146

1 2 3 4 5 6

| Account | Name | YOP | ILTS | CLTS | DPI | IRS | Replace |
|---|---|---|---|---|---|---|---|
| 10104S C | Newton (1) | 1 | 0.055 | 0.055 | 0.000 | 0.065 | -0.010 ⚑ |
| 10104Sa C | Newton (2) | 1 | 0.055 | 0.055 | 0.000 | 0.065 | -0.010 ⚑ |
| 10120 C | Caton | 1 | 0 | 0 | 0.000 | 0.069 | -0.069 ⚑ |
| 10164O | Vresics | 1 | 0 | 0 | 0.000 | 0.069 | -0.069 ⚑ |
| 10186E | Sunny | 1 | 0 | 0 | 0.000 | 0.069 | -0.069 ⚑ |
| 10206Y C | Semmer | 1 | 0 | 0 | 0.000 | 0.069 | -0.069 ⚑ |
| 1030A | George | 1 | 0 | 0 | 0.000 | 0.069 | -0.069 ⚑ |
| 1046Q C | Lushinsky | 1 | 0 | 0 | 0.000 | 0.069 | -0.069 ⚑ |
| 10697D | Boyer | 1 | 0.068 | 0.068 | 0.000 | 0.054 | 0.014 |
| 10760C | Pulley | 1 | 0 | 0 | 0.000 | 0.069 | -0.069 ⚑ |
| 10924G | Gerchufsky | 1 | 0.065 | 0.065 | 0.000 | 0.050 | 0.015 |
| 1092C C | Distefano | 1 | 0.055 | 0.055 | 0.000 | 0.065 | -0.010 ⚑ |
| 10966Q | Seier | 1 | 0.076 | 0.076 | 0.000 | 0.065 | 0.011 |

Failed Tanks
Only - Go

- Show all accounts that did not pass inspection process

*FIG. 11*

Using The System
Data Trend Report
Sortable Data Points

- Tank Gauge (10, 12, 14)
- Tank Type (upright, flat)
- Pass/Fail
- Feed in Concrete
- Distance From Wall
- Location (Inside/Outside)
- Feed Type (Bottom, Side, Top)
- Seasonal Residence
- Exposed to Salt Water
- Dirt Floor
- Finished Basement
- Basement Condition (Wet/Dry)
- On a Pad (outside tanks)
- Hazards
- Comments
- WHI - (Tanks that are within .001 - .009 of failing)

*FIG. 12*

Using The System
Acronym Definitions

Data Trend Report

*Summary*                                          Change Selection

Selected: Tank Status Pass
Total Records: 482     Total Replace: 2     Replace Percentage: 0.415 %

*Detail*

Records: 1 through 25 of 482

1 2 3 4 5 6 7 8 9 10 11 12 13 14 15 16 17 18 19 20

| Account | Name | YOP | ILTS | CLTS | DPI | IRS | Replace |
|---------|------|-----|------|------|-----|-----|---------|
| 7887 | Stevens | 2 | 0.085 | 0.075 | 0.010 | 0.084 | -0.009 ⚑ |
| 7885 | Dunham | 2 | 0.09 | 0.081 | 0.009 | 0.085 | -0.004 ⚑ |
| 1456 | Dykes | 3 | 0.083 | 0.08 | 0.003 | 0.073 | 0.007 |
| 7886 C(H) | Hand | 2 | 0.09 | 0.085 | 0.005 | 0.077 | 0.008 |
| 8002 (C) | Nadeau | 2 | 0.093 | 0.085 | 0.008 | 0.077 | 0.008 |
| 1461 | Stankc | 2 | 0.083 | 0.083 | 0.000 | 0.074 | 0.009 |
| 1455 | Swan | 2 | 0.083 | 0.083 | 0.000 | 0.074 | 0.009 |

C - means there are comments for this tank

H - means there is a hazard near this tank

YOP - Years on Program
ILTS - Initial Low Test Score
CLTS - Current Low Test Score
DPI - Degradation Profile Index
IRS - Individual Replacement Standard A Flag indicates that tank should be replaced

*FIG. 14*

RESIDENTIAL FUEL TANK MONITORING SYSTEM AND PROACTIVE REPLACEMENT PROGRAM

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

Fuel oil for residential and business heating systems are usually stored in a tank at the premises where the heating system is located. For residential installations the fuel tank is usually located in the basement of a house or outside the home. Deterioration of the fuel tank over time can result in fuel leakage with consequent damage to the premises as well as environmental contamination. Fuel tanks are usually visually inspected by fuel dealers or other service personnel during annual heating system maintenance, but such visual inspection does not reveal many deteriorating tank conditions and does not provide any accurate predictor of tank life. Ultrasonic thickness testers are known for testing the wall thickness of tanks and other vessels; however, such ultrasonic testing has not been applied in a residential application to monitor the condition of fuel oil tanks or to provide data in a systematic way for prediction of the remaining useful lifetime of a fuel tank.

It would be beneficial to have a system for predicting the useful lifetime of fuel oil tanks to minimize the likelihood of a fuel tank failure and the consequent cost, damage and hazard which would be occasioned by a fuel spill. Fuel oil dealers typically wait until a tank leaks before replacing it.

BRIEF SUMMARY OF THE INVENTION

In accordance with the present invention, a data collection, tank analysis and management system is provided for monitoring the condition of fuel tanks and for determining for each tank a degradation profile which provides an estimate of useful tank life and a prediction of when the tank is likely to need replacement before failure. The system is especially useful for monitoring residential fuel tanks and is also applicable for commercial and other tanks which are in a location where a tank failure would be harmful and potentially hazardous.

A primary benefit of the system is to allow fuel dealers to identify tanks that should be replaced before they actually fail. The system provides the dealer with information which is useful in monitoring and servicing the fuel tanks of the dealers' customers.

The system comprises a computer database management system located at a central computer, and one or more remotely located data entry terminals for entry into the database of applicable data, preferably via an internet or web browser. Typically the data entry terminals, which are usually personal computers, are located at the facilities of fuel dealers who are using the monitoring system. The database is maintained on a server computer disposed at the facility of the provider of the monitoring system.

In operation, each dealer having access to the monitoring system, logs on to the provider's web site to gain access to the monitoring system for entry of data for the dealer's customers' fuel tanks and for obtaining reports on the state of each customer's fuel tank.

Fuel tank data for each tank is obtained from ultrasonic tank wall testing and from visual inspection of tank installation. Tank testing is performed by dealer service personnel usually during an annual or other periodic service visit to a customer's premises. Testing is accomplished using an ultrasonic thickness gauge to provide indications of tank wall thickness at various locations on the tank. Decreasing wall thickness is a measure of wall deterioration due to corrosion and ultimate failure. The thickness measurements are recorded on a form by the service person and the measurements and other information on tank condition, the environment that the tank is in, certain physical characteristics, certain liability considerations and the like are entered and downloaded from the dealer's computer to the central database where the data is used for providing trend and lifetime information for each fuel tank.

Alternatively, the tank measurements as well as other information on tank installation and condition can be directly downloaded to the database using a portable data terminal such as a wireless handheld device. As a further alternative, the data collected during a testing routine can be entered into a data logging device associated with or built into the ultrasonic thickness gauge. This stored data can then be downloaded to the database at a convenient time or the stored data can be downloaded to the dealer computer and then downloaded from the dealer computer to the database at the central computer.

The system analyzes, for each tank in the system, data on tank thickness measurements, tank condition, location and other factors to provide indications of useful tank lifetime, and prediction of replacement time for each tank, by creating an individualized replacement standard for each tank based on all the data.

BRIEF DESCRIPTION OF THE SEVERAL VIEWS OF THE DRAWINGS

The invention will be more fully described in the following detailed description in conjunction with the drawings in which:

FIG. 2 illustrates an inspection form used in practice of the invention;

FIG. 5 shows a web page for entering data;

FIG. 6 shows another web page for entry of data;

FIG. 9 shows a report of selected data;

FIG. 10 shows another report of selected data;

FIG. 11 shows a report of failed tank data;

FIG. 12 shows a report listing sortable data points;

FIG. 14 shows a listing of acronyms and nomenclature utilized in the system reports.

DETAILED DESCRIPTION OF THE INVENTION

In a preferred business model, the monitoring system is operated by a service provider which maintains a server computer containing database management software at its facility. Customers of the service provider are usually fuel oil dealers or HVAC companies who are provided access to the monitoring system via the dealer's own computer which communicates with the service provider's central computer via the Internet.

Figure 1:
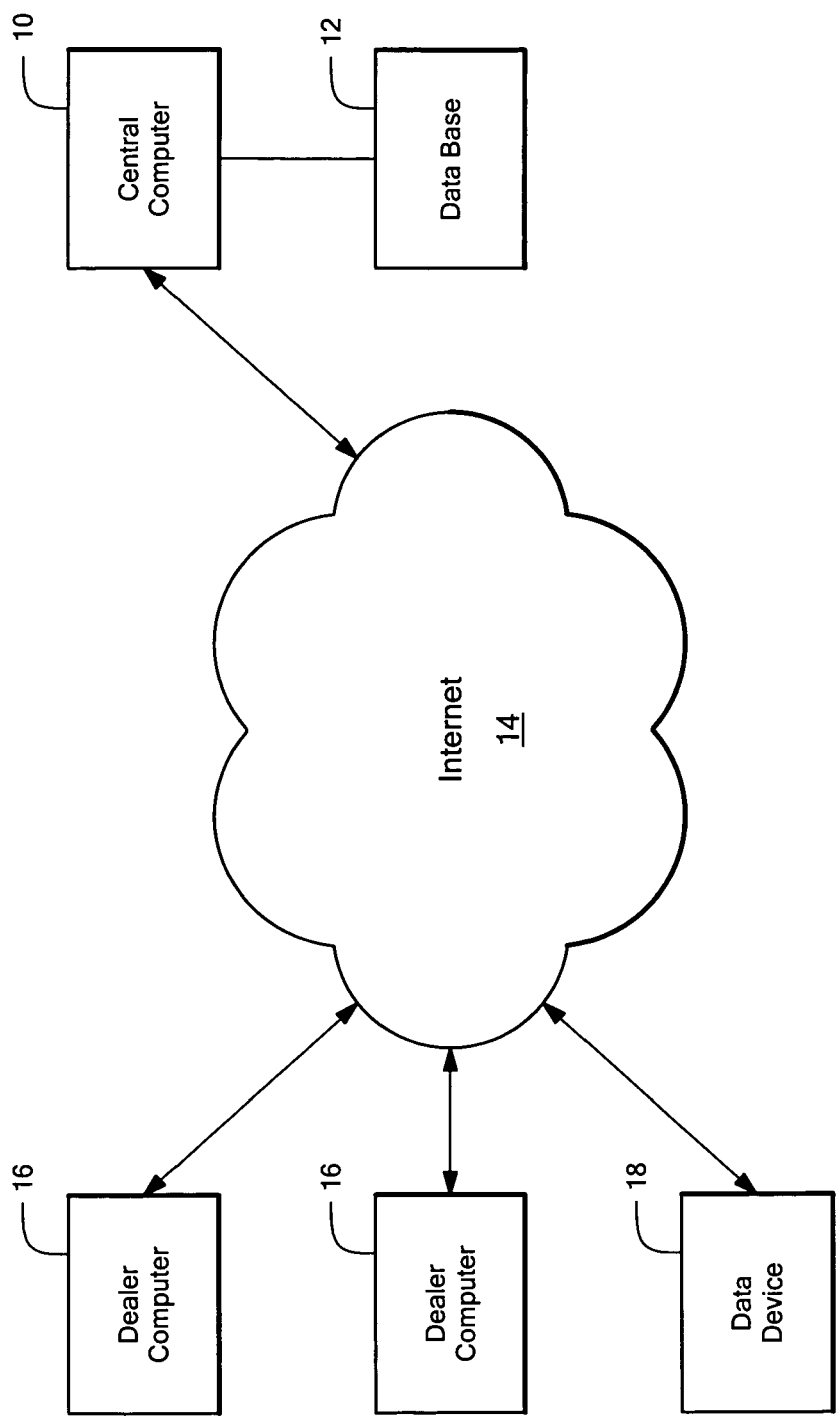
FIG. 1 is a diagrammatic illustration of a data communications system in which the invention can be employed.

Referring to FIG. 1, there is shown a central computer 10 having a database 12 and which can communicate with dealer computers via the Internet 14 or other data network. A plurality of dealer computers 16 are connectable via the Internet for data communication with central computer 10. A data device 18 can also be in communication with the central computer 10 via the Internet. The data device can be for example, a wireless data device such as a handheld data terminal. The dealer computers are usually personal computers having a browser for Internet access. The central computer can also be a personal computer or server having sufficient data storage and speed to suit intended system performance requirements. The monitoring system software is contained in the database 12 of the computer 10. The system software can be implemented utilizing database management software such as Microsoft Access. It will be recognized that the computers are operating in a client-server mode for communication of data from the dealer computers to the central computer, and from the central computer to the dealer computers. Other data communication modes can be employed including data networks other than the Internet, and other wired and wireless data networks and data links.

The acronyms and nomenclature described herein are set forth in FIG. 14.

Data on the fuel tanks of the fuel dealer's customers is obtained by the dealer's service technicians. During a visit to the customer's premises at which a tank is located, the technician obtains data on the particular tank, including the gauge of the tank, and performs ultrasonic testing of the tank to provide measurements of tank wall thickness. In the North American market fuel oil tanks for residential installations are usually 12 gauge and 14 gauge. A 12 gauge tank has a wall thickness of approximately 0.1 inch, and a 14 gauge tank of approximately 0.078 inch. For each tank to be monitored, an ultrasonic thickness test is performed at the top of the fuel oil storage tank which is an area not likely to be affected by corrosion, and these measurements are employed to confirm the tank gauge. A typical ultrasonic thickness gauge utilized to provide thickness measurements is the Dakota Ultrasonics MX-1, which is a small handheld unit readily transportable by a service technician. The bottom of the fuel oil storage tank is also tested at random sample points, typically on either side of the bottom center line of the tank, to provide a number of test scores and to determine an Initial Low Test Score (ILTS) as a benchmark for the tank during its first year of monitoring. The location where the low test score was found is also identified and will be tracked during the monitoring process. The tank test is repeated each year or other periodic interval, and successive annual tests are stored by the system and provide a historical record. The Current Low Test Score (CLTS) represents the lowest annual test score for the latest test. The scores provide a comparison and a basis to measure both the velocity and distance or extent of tank degradation due to corrosion.

Additional data is obtained by the service technician during inspection of each tank to create reports on tank lifetime and predicted replacement time. Data for each tank relates to the environment the tank is in, the physical characteristics of the tank, the distance and velocity of tank degradation based on the ILTC and CLTS and certain other considerations as further discussed below.

A typical tank inspection form is illustrated in FIG. 2. Customer name and address information is provided, as is tank information including tank gauge. The tank gauge test score as determined from measurements at the top of the tank is provided to verify the tank gauge which is important in determining degradation measurements for the appropriate gauge. The feed type is noted to identify whether the fuel feed is on the bottom, side or top of the tank. The tank type is also noted to identify whether the tank is an upright or flat style of tank. The fuel oil capacity of the tank is specified as is the tank manufacturer. The form also notes the distance of the tank from the wall, whether the feed line is in concrete or not, whether the tank is exposed to saltwater and whether the tank is located in a seasonal residence. For outside locations, the form notes whether or not the tank is on a mounting pad and whether or not there are any hazards in the location and what the hazard is. For example, a hazardous condition could be that a tree limb has grown over the proximity of the tank. The inside location data notes whether the tank is on a dirt floor or in a finished basement and the condition (wet or dry) of the basement.

The form also notes the lowest ultrasonic thickness reading and location of the lowest reading represented by the location positions as shown on the tank diagram on the form. The pass/fail status of the tank is noted as is any comment on potential code violations such as an undersized ventilation pipe. A number of data factors are identified and can be selectively specified for use in monitoring each tank and for determining and predicting potential failure.

Each tank to be part of the monitoring program, must qualify by having a minimum test score of 0.081 inch for a 12 gauge tank and 0.07 inch for a 14 gauge tank. If the initial low test score is below these numbers, that tank would not qualify for the monitoring program as the condition of the tank is sufficiently deteriorated as to need prompt replacement. If the tank fails the initial test, the customer is notified of the tank test failure and is provided with a recommendation to promptly replace the tank. Information on the failed tank is entered into the system to provide a record of non-qualified tanks for which follow up actions can be taken by the dealer.

If the tank passes the qualification test, the data on the inspection form is entered into the monitoring system. Data from the inspection form is keyed into the dealer's computer and transmitted to the monitoring system using an Internet connection between the dealer's computer and the service provider's computer. The dealer accesses the monitoring system by logging into the service provider's web site using the dealer's e-mail name and password. After login, the system prompts a user through the steps for use of the system. Various pages or screens are shown in FIGS. 3 through 7 for the monitoring system.

Figure 3:
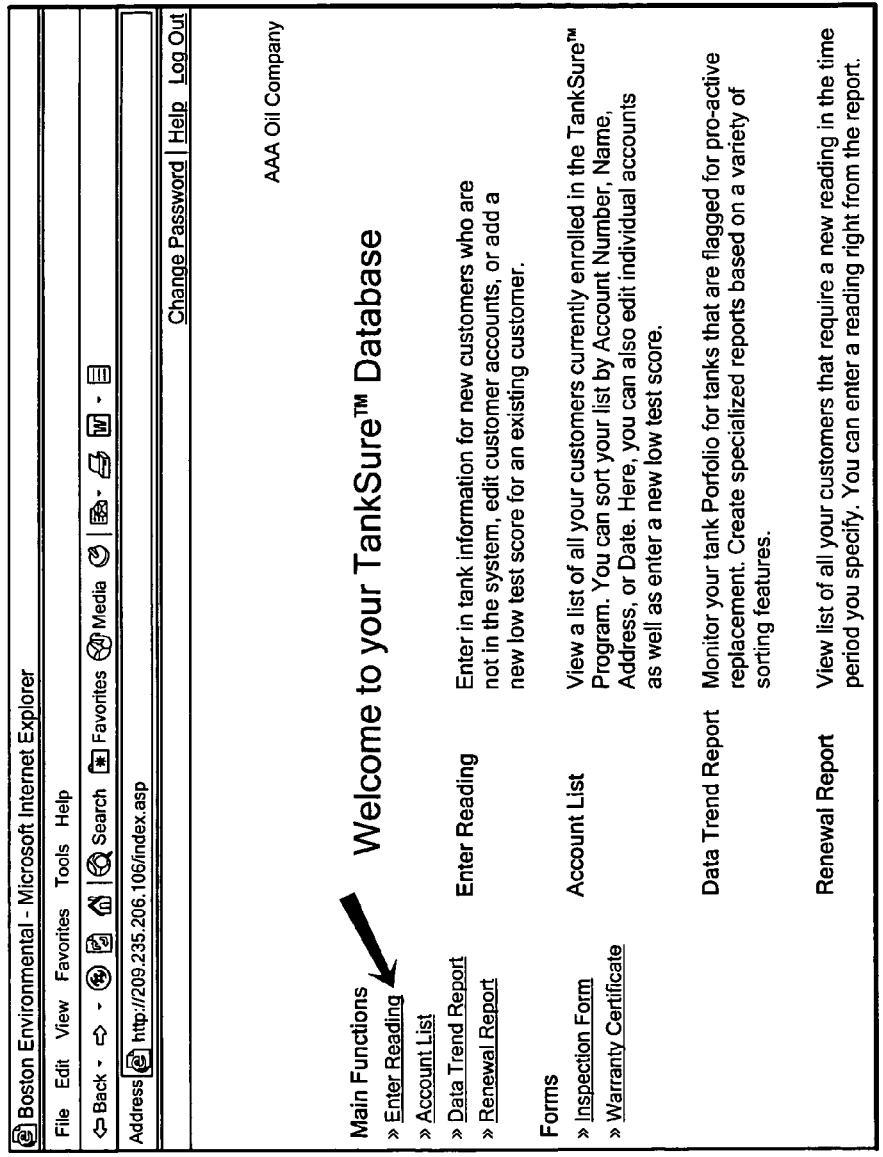
FIG. 3 shows a web page for use in the invention.

The introduction page shown in FIG. 3 identifies the functions which can be performed and the forms which can be generated by the system. The Enter Reading function permits entry of tank information for new customers, editing of customer accounts and adding of new test scores for existing customers. The Account list provides a view of customers enrolled in the program and which can be sorted by various parameters. The Data Trend report provides a report of tanks being monitored, with those tanks being flagged for proactive replacement based upon the data analysis provided by the system. Specialized reports based on a variety of sorting features can also be generated. A Renewal report can be provided to provide a list of customers that require a new reading in a specified time period. The system can also generate, upon request, an inspection form and a warranty certificate for a customer.

Figure 4:
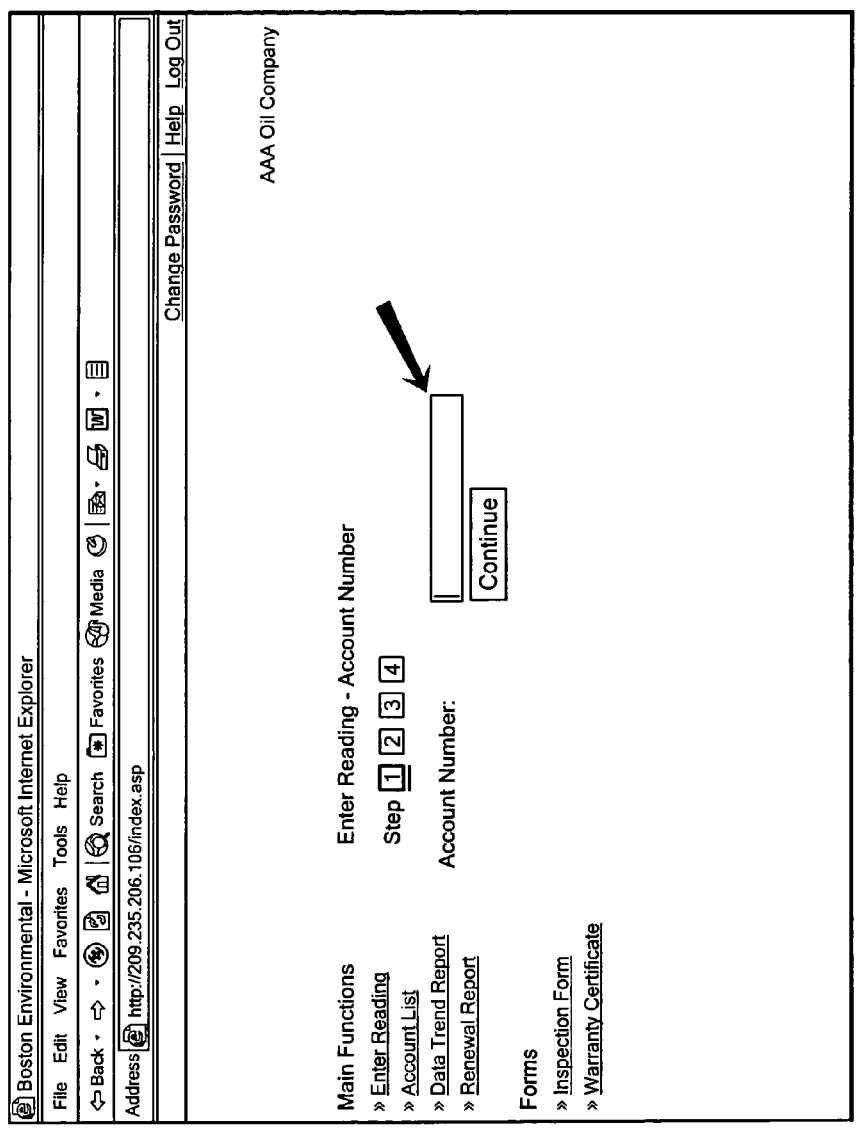
FIG. 4 shows a web page for data entry into the system of the invention.
Figure 7:
FIG. 7 shows a web page for review of entered data.

The data entry sequence is shown in FIGS. 4 through 7. As an initial step, the account number for the particular fuel tank is entered as shown in FIG. 4. In the next step, the screen of FIG. 5 appears for entry of customer information and tank information as shown in the entry form. After this form has been completed the next form appears as shown in FIG. 6 which calls for entry of ultrasonic test readings. The next screen is shown in FIG. 7 which presents the entered information for review and verification. Upon completion of the entry sequence, the data is stored in the database for the associated customer account.

If a tank does not qualify in accordance with the qualifying criteria, as noted above, a notice is generated by the system and is sent to the customer to warn of the potential tank failure and to recommend that the tank be promptly replaced.

If the tank qualifies in accordance with the qualifying criteria, as noted above, the system can generate a warranty certificate which is sent to the customer to provide a written warranty and conditions of warranty for the tank enrolled in the monitoring program provided by the system.

Figure 8:
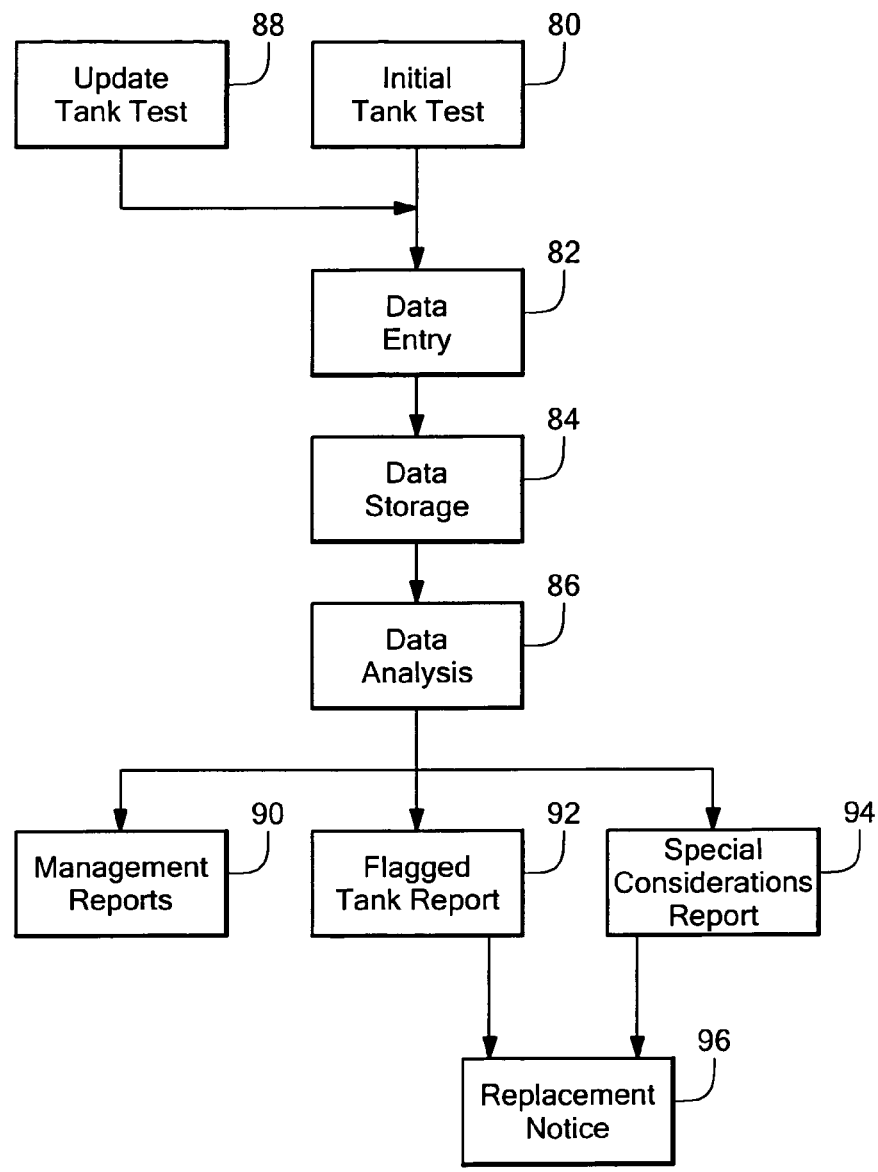
FIG. 8 is a flowchart illustrating system operation.

A flowchart of system operation is illustrated in FIG. 8. An initial tank test is performed in step 80 and test and other data relating to the tank are entered in step 82 using the dealer computer or other data entry device, and stored in the central computer at step 84. The central computer 10 performs data analysis in step 86 and is operative to provide various reports as described herein. At each new year or other periodic interval, updated tank tests are performed in step 88 and this updated data is entered and stored as described above. Various management reports 90 can be provided from the data analysis. The data analysis can also provide a Flagged tank report 92 such as shown in FIG. 11, to denote all of the monitored tanks which have failed the testing. A Special Considerations report 94 can also be generated to identify monitored tanks which are not sufficiently deteriorated to be "flagged" for replacement but which are considered to be at risk for failure because of particular circumstances to be described below. The tanks identified in either of the reports 92 or 94 can be subject to a replacement notice 96 which is sent to each tank account customer as a notification that the tank is recommended for replacement.

The tank data entered into the system database is available to each dealer via the Internet connection for review of customer data by the dealer and for obtaining reports on customers and tank profiles based on various selection criteria which can be specified by the dealer. The system can respond to the selection criteria to issue the appropriate report and information contained therein.

Another report provides a listing of those tanks that have been disqualified and for which replacement has been recommended. This report can be utilized for follow up by the dealer with those customers for whom tank replacement has been recommended.

A Data Trend report is shown in FIG. 9 and provides a list of account numbers and customer names with initial and current low test scores for the respective fuel tanks, and a Degradation Profile Index (DPI) which is the difference between the ILTS and the CLTS. The Individual Replacement Standard (IRS) provides a measure of the velocity of change in the test scores. The IRS value is computed by the system based upon a variety of factors including the velocity of degradation, gauge of the tank, feed line position, the environment in which the tank is located, and certain liability factors. For example a tank that is located in a dirt floor basement vs. a cement floor basement, etc. A Replace value is computed based on the difference between CLTS and IRS, a negative difference value being is an indication that the tank should be replaced. The replacement status is indicated by a flag symbol next to the respective Replace values. Thus, the system provides, for each tank, an estimate of useful tank life and a prediction of when the tank is likely to need replacement before tank failure.

The inspection form shown in FIG. 2 sets forth the data factors employed to generate the Individual Replacement Standard (IRS) and to specify the factors which can be selectively sorted to identify Flagged tanks, or Special Considerations or other conditions to be sorted and reported.

Each of the factors has an assigned numerical value stored in the system database and which is utilized by the system to compute an IRS value for the associated tank. This IRS value is subtracted from the CLTS to yield a Replace score for that tank. If the Replace score is negative, the tank is flagged for replacement. It will be appreciated that the system takes into account all of the relevant factors which can affect useful tank lifetime. These factors relate to the tank itself, and to the environment in which the tank is located.

In the following example a 12 gauge tank is in a wet basement, and has a side feed that is within 2 inches of a wall, and a DPI of 0.005.

Profile Description:

12 Gauge Tank: 0.065

14 Gauge Tank: 0.05

Outside Tank: 0.002

Side or Top Feed: 0.005

Inside Dirt Floor: 0.005

Finished Basement: 0.005

Distance from Wall<2: 0.004

Exposed to Salt Water: 0.006

Wet Condition: 0.002

The IRS=0.065+0.002+005+004+0.005=0.081

Replace Score=CLTS−IRS

In this example, the system is considering key factors that relate to the tank's individual risk and failure profile characteristics. These include physical characteristics like gauge and location of feed line, environmentally related influences like being in a wet basement and having a lack of "breathing space" between the tank and adjacent wall, and the tank's degradation profile and the velocity of that degradation based on a series of annual ultrasonic test scores. All of these factors will contribute over time to the tank's required replacement. The IRS is a "fluid" value and may change year over year based on the annual ultrasonic test and changes in the DPI relating to the Current Low Test Score.

The tank is flagged when the Replace score is a negative number. The lower the Replace score the worse the tank condition is.

Some tanks can be identified by a C code to designate that there are comments for this tank. The comments can be that there is a building, fire or other regulatory code requirement to be addressed. Some tanks can be identified by an H code which identifies a hazardous condition near the tank, such as tree limbs overhanging an outside tank. These codes C and H can be shown next to the account number as illustrated in FIGS. 9 and 10. A report of accounts having C and/or H designations can be generated to identify those accounts where corrective actions are needed.

FIG. 10 shows a report which identifies only seasonal residences and the tank data for those residences. These tanks may be a greater liability since the residence is unoccupied for much of the year, and thus a fuel leak may go undetected. The tanks in the seasonal residences are identified by their test scores to be monitored on a more frequent basis and owners notified of risk conditions.

The report shown in FIG. 11 lists only failed tanks that did not pass the inspection and that should be replaced or are near replacement.

The report illustrated in FIG. 12 lists various selection characteristics which can be specified to provide a selective data sort to identify tanks meeting the selection criteria. The resulting data is used for analysis of the listed tanks so that appropriate action may be taken in suggesting replacement or other tank service.

Figure 13:
FIG. 13 shows a report listing customer accounts.

The system can also provide a report which lists all accounts that are part of the monitoring program, and such a report is illustrated in FIG. 13. This report shows account number, name and address of each account holder, the date when the account started, and the date of the last tank reading. Each account entry can be edited or the account can be read or opened to see the associated data for the monitored tank of that account.

As noted above, tanks can be identified as having "Special Considerations" and which can be proactively replaced based on specific data characteristics. A tank may not yet be identified as a Flagged Tank that needs replacement, but is identified as a "Special Considerations" candidate which is considered to be at risk for failure because of certain circumstances. Data can be sorted by a search category called Within a Hundredth of an Inch (WHI). This category selects those tanks in the database that are in a range of 0.001–0.009 in the Replace category and which represents a marginal condition for tanks having certain predetermined conditions. A "Special Considerations" can, for example, be a tank that has a Replace score of 0.001 and that is at risk as being in a seasonal residence where no one is home for months of a year, or a home with a dirt floor basement where oil can leak into the ground. Various other reasons can be specified for use in determining a "Special Considerations" category for the monitored tanks, such as a tank requiring considerable code upgrades that also is in the WHI category.

The system provides management reports for the dealer to improve the efficiency and quality of service that can be provided to customers and to identify those tanks requiring replacement or other attention before leakage may occur. As an example, a service technician can be directed, based on data from the system to inspect a seasonal home tank before the resident leaves for the off season. The system can also provide data to track hazards such as tree limbs growing over outside tanks and to identify code upgrade requirements, such as a tank with poor support legs. The system also can identify those tanks for which the service schedule should be adjusted or for which various other corrective actions should be taken.

The system provides an extremely versatile management tool for fuel oil dealers, HVAC contractors and the like to track the conditions of customers' fuel tanks and provide proactive information on tank replacement and remediation of other potentially hazardous or damaging conditions.

The invention is not to be limited by what has been particularly shown and described. It will be appreciated that alternative implementations will occur to those of skill in the art without departing from the spirit and true scope of the appended claims.

What is claimed is:

1. A method for monitoring residential fuel tank condition comprising the steps of:
   establishing in a central database an account for each owner of the fuel tanks to be monitored;
   entering in the central database data on the physical condition of each fuel tank including measurement of tank wall thickness;
   entering in the central database data on the environment in which each fuel tank is located;
   processing the data for each tank to determine a score indicating useful tank lifetime and predicted replacement time; and
   providing an indication based on the score of when each tank needs replacement.

2. The method of claim 1 including the step of providing one or more reports containing tank condition data.

3. The method of claim 2 including the step of providing a report based upon selected data factors to identify the fuel tanks where replacement is needed.

4. The method of claim 1 wherein the data entered in the database includes an initial low test score.

5. The method of claim 4 wherein the data entered in the database includes a current low test score.

6. The method of claim 5 wherein the processing step includes providing a degradation profile index which is the difference between the initial low test score and the current low test score.

7. The method of claim 6 wherein the processing step includes providing a replacement score based upon the degradation profile index and other data entered in the database.

8. The method of claim 7 wherein the replacement score is the difference between the current low test score and an initial replacement standard which is a measure of the rate of change of test scores over time.

9. The method of claim 8 wherein the providing step including providing a report of tanks which need replacement.

10. A method for monitoring residential fuel tank conditions comprising the steps of:
    establishing a data entry system on a communications network;
    providing a database in communication with the communications network;
    establishing an account for a corresponding account holder in the database;
    entering data via the communications network in the database representing fuel tank conditions for each account holder; and
    processing the tank data to provide an indication of the useful life of the tank and the predicted replacement time for the tank.

11. The method of claim 10 including the step of establishing from the entered data for each account, information on the condition and installation of the fuel tank associated with that account.

12. The method of claim 10 wherein the communications network is the internet.

13. The method of claim 10 wherein the processing step includes providing an indication of special considerations which denote one or more increased risk conditions for the tank.

* * * * *